United States Patent
Suzuki et al.

(10) Patent No.: US 6,311,963 B1
(45) Date of Patent: Nov. 6, 2001

(54) FLUID-FILLED VIBRATION DAMPING DEVICE

(75) Inventors: Tatsuya Suzuki, Kasugai; Kazuhiko Kato, Komaki, both of (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 09/452,352

(22) Filed: Dec. 1, 1999

(30) Foreign Application Priority Data

Dec. 22, 1998 (JP) .................................................. 10-365241

(51) Int. Cl.$^7$ ...................................................... F16F 5/00
(52) U.S. Cl. ...................................... 267/140.13; 267/219
(58) Field of Search .......................... 267/140.11, 140.13, 267/219; 248/562, 636

(56) References Cited

U.S. PATENT DOCUMENTS

| 4,997,168 | 3/1991 | Kato ................................. 267/140.11 |
| 5,104,100 | * 4/1992 | Simuttis ................................. 267/219 |
| 5,985,032 | * 4/1999 | Simuttis ................................. 267/219 |
| 6,131,894 | * 10/2000 | Satori et al. ..................... 267/140.13 |

FOREIGN PATENT DOCUMENTS

| 2 686 957-A1 | * 8/1993 | (FR) ................................. 267/140.11 |
| 2 055 172 A | 2/1991 | (GB) . |
| 1-238730-A | * 9/1989 | (JP) ................................. 267/140.11 |
| 3-292431 | 12/1991 | (JP) . |
| 10-339348 | 12/1998 | (JP) . |

* cited by examiner

Primary Examiner—Robert J. Oberleitner
Assistant Examiner—Thomas J. Williams
(74) Attorney, Agent, or Firm—Hurr & Brown

(57) ABSTRACT

A fluid-filled vibration damping device including a first mounting member, a second mounting member including a tubular portion having an end open toward the first mounting member, the first and second mounting members being spaced from, and opposed to, each other, an elastic rubber body which elastically connects the first and second mounting members to each other, and which fluid-tightly closes the open end of the tubular portion of the second mounting member and cooperates with the tubular portion to define a fluid chamber filled with a non-compressible fluid, and a working member which is supported by the first mounting member such that the working member extends, in the fluid chamber, in a direction substantially perpendicular to a central axis of the tubular portion of the second mounting member, and thereby divides the fluid chamber into two divided chambers which are located on opposite sides of the working member, respectively, and which are communicated with each other via a fluid-flow restricting passage defined by at least the working member, the elastic rubber body including at least one thin portion which is located on a side of one of the two divided chambers and which is thinner than a remaining portion of the rubber body so as to be more easily elastically deformable than the remaining portion.

12 Claims, 6 Drawing Sheets

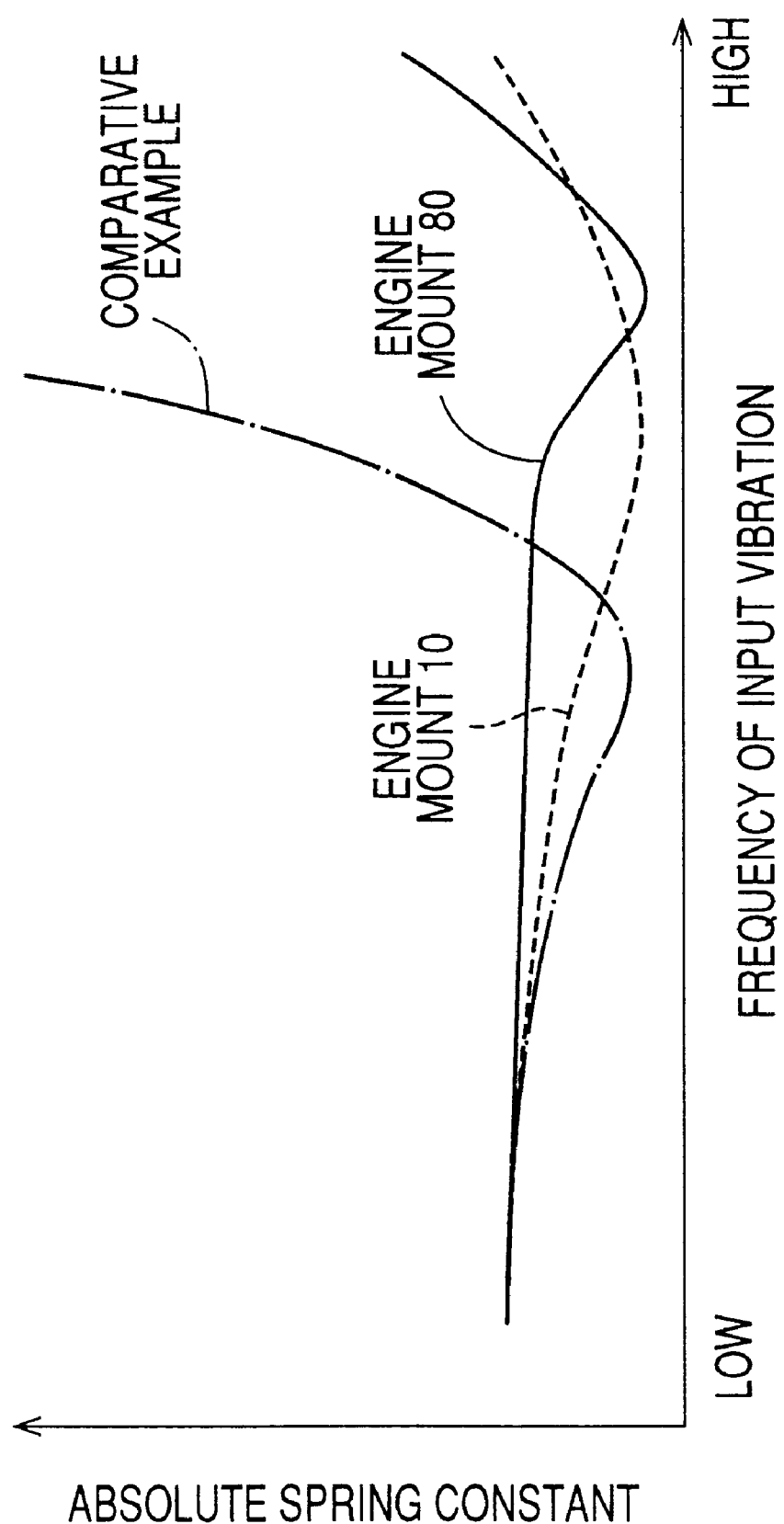

FLUID-FILLED VIBRATION DAMPING DEVICE

BACKGROUND OF THE INVENTION

1. Field of the Invention

The present invention relates to a fluid-filled vibration damping device which exhibits a vibration damping effect based on flows of a non-compressible fluid enclosed therein, and which is particularly suitable for use as, e.g., automotive-vehicle engine mounts, body mounts, and differential mounts.

2. Related Art Statement

There is known a fluid-filled vibration damping device as a sort of vibration damping connecting or supporting device that is interposed between constituent members of a vibration transmitting system. The fluid-filled vibration damping device includes a first mounting member; a second mounting member including a tubular portion having an end open toward the first mounting member, the first and second mounting members being spaced from, and opposed to, each other; and an elastic rubber body which elastically connects the first and second mounting members to each other, and which fluid-tightly closes the open end of the tubular portion of the second mounting member and cooperates with the tubular portion to define a fluid chamber filled with a non-compressible fluid. When a vibrational load is applied to the vibration damping device, it exhibits a vibration damping effect based on flows of the fluid in the fluid chamber, in particular, resonance of the fluid.

Meanwhile, there has been proposed another fluid-filled vibration damping device which includes, in addition to the above-indicated members, a working or umbrella-shaped member which is supported by the first mounting member such that the umbrella member extends, in the fluid chamber, in a direction substantially perpendicular to a central axis of the tubular portion of the second mounting member, and thereby divides the fluid chamber into two divided chambers which are located on opposite sides of the umbrella member, respectively, and which are communicated with each other via a fluid-flow restricting passage defined by at least the umbrella member.

To the second fluid-filled vibration damping device including the umbrella member, a main vibrational load is applied in a direction in which the first and second mounting members are opposed to each other, i.e., a direction parallel to the central axis of the tubular portion of the second mounting member. Upon application of the main vibrational load to the vibration damping device, the umbrella member is reciprocatively moved in the fluid chamber, so that the fluid flows through the fluid-flow restricting passage. The vibration damping device can exhibit a vibration damping effect based on the flows of the fluid through the restricting passage, in particular, the resonance of the fluid.

However, even in the second fluid-filled vibration damping device, the vibration damping effect based on the flows of the fluid through the restricting passage defined by the umbrella member is not satisfactory yet and, in some cases, the vibration damping device cannot exhibit a low dynamic spring effect to a desirable degree.

SUMMARY OF THE INVENTION

It is therefore an object of the present invention to provide a fluid-filled vibration damping device which has an improved structure for exhibiting an excellent vibration damping effect based on flows of a non-compressible fluid enclosed in a fluid chamber.

The present invention provides a fluid-filled vibration damping device which has one or more of the technical features that are described below in respective paragraphs given parenthesized sequential numbers (1) to (16). Any technical feature which includes another technical feature shall do so by referring, at the beginning, to the parenthesized sequential number given to that technical feature. Thus, two or more of the following technical features may be combined, if appropriate. Each technical feature may be accompanied by a supplemental explanation, as needed. However, the following technical features and the combinations thereof are just examples to which the present invention is by no means limited. Rather, the concept of the present invention should be construed based on the overall description of the specification and the drawings.

(1) According to a first feature of the present invention, there is provided a fluid-filled vibration damping device comprising a first mounting member; a second mounting member including a tubular portion having an end open toward the first mounting member, the first and second mounting members being spaced from, and opposed to, each other; an elastic rubber body which elastically connects the first and second mounting members to each other, and which fluid-tightly closes the open end of the tubular portion of the second mounting member and cooperates with the tubular portion to define a fluid chamber filled with a noncompressible fluid; and a working member which is supported by the first mounting member such that the working member extends, in the fluid chamber, in a direction substantially perpendicular to a central axis of the tubular portion of the second mounting member, and thereby divides the fluid chamber into two divided chambers which are located on opposite sides of the working member, respectively, and which are communicated with each other via a fluid-flow restricting passage defined by at least the working member, the elastic rubber body including at least one thin portion which is located on a side of one of the two divided chambers and which is thinner than a remaining portion of the rubber body so as to be more easily elastically deformable than the remaining portion.

In the fluid-filled vibration damping device according to the first feature (1), the elastic rubber body includes at least one more easily elastically deformable thin portion which is located on the side of one of the two divided chambers which are communicated with each other by the fluid-flow restricting passage. Accordingly, when a vibrational load is input to the vibration damping device and the working member is reciprocatively or periodically moved in the fluid chamber, the thin portion is more easily elastically deformed to permit a relative change between respective volumes of the two divided chambers. That is, the fluid is permitted to flow in more amount through the restricting passage. Therefore, the present vibration damping device can exhibit a higher vibration damping effect based on the flows of the fluid through the restricting passage.

The fluid-flow restricting passage may be defined by, and between, respective opposed portions of an outer circumferential surface of the working member and an inner circumferential surface of the fluid chamber, or may additionally include at least one through-hole formed through the thickness of the working member. The shape or structure of the working member is by no means limited. For example, the working member may have a circular, an elliptical, or a polygonal outer periphery or contour.

Otherwise, an outer circumferential surface of the working member may be covered with an elastic rubber layer. The means or structure used for attaching the working member to the first mounting member is by no means limited. For example, the first mounting member may include an integral support axial portion which projects from the remaining portion of the first member into the fluid chamber, and the working member may be fixed by, e.g., caulking to a free end portion of the axial portion that projects in the fluid chamber. The shape of the elastic rubber body is by no means limited, and may be determined depending upon, e.g., vibration damping characteristics the vibration damping device is required to have. For example, the elastic rubber body may have a thick disc-like shape, and the tubular portion of the second mounting member may be fixed to an outer circumferential surface of the disc-like rubber body. Alternatively, the rubber body may have a frustoconical shape or a thick-walled tapered tubular shape that projects from the tubular portion of the second mounting member in an outward direction away from the open end of the tubular portion. In the latter case, the first mounting member is fixed to an end surface of the small-diameter end portion of the tapered rubber body, and the tubular portion of the second mounting member is fixed to an outer circumferential surface of the large-diameter end portion of the tapered rubber body.

(2) According to a second feature of the present invention that includes the first feature (1), the elastic rubber body includes a plurality of thin portions which are located on the side of the one divided chamber and each of which is thinner than the remaining portion of the rubber body so as to be more easily elastically deformable than the remaining portion, the thin portions being provided around the central axis of the tubular portion such that the thin portions are substantially equiangularly spaced from each other about the central axis.

In the fluid-filled vibration damping device according to the second feature (2), the elastic rubber body includes a plurality of thin portions. Accordingly, the present vibration damping device exhibits a higher vibration damping effect based on the flows of the fluid through the fluid-flow restricting passage. In addition, since the plurality of thin portions are spaced from each other, the elastic rubber body enjoys a sufficiently high support spring strength. Moreover, since the plurality of thin portions are substantially equiangularly spaced from each other about the central axis of the tubular portion of the second mounting member, the flows of the fluid in the fluid chamber or through the restricting passage are stabilized when the working member is reciprocatively moved in the fluid chamber. In addition, the rubber body is effectively prevented from local concentration of stress and accordingly the elastic deformation of the rubber body is stabilized. Thus, the present vibration damping device can exhibit desirable vibration damping performance with higher stability.

In the fluid-filled vibration damping device according to the second feature (2), it is preferred that the plurality of thin portions comprise four thin portions two of which are opposed to each other in one of two directions each of which is perpendicular to the central axis of the tubular portion of the second mounting member and which perpendicularly intersect each other on the central axis, and the other two of which are opposed to each other in the other of the two directions. In this case, the rubber body includes four thick portions which are alternate with the four thin portions about the central axis, that is, are angularly spaced from the corresponding thin portions by 45 degrees. Like the four thin portions, two of the four thick portions are opposed to each other in one of two directions each of which is perpendicular to the central axis and which perpendicularly intersect each other on the central axis, and the other two thick portions are opposed to each other in the other of the two directions. Therefore, the rubber body enjoys a sufficiently high spring hardness or stiffness in radial directions thereof perpendicular to the central axis.

(3) According to a third feature of the present invention that includes the first or second feature (1) or (2), the elastic rubber body includes at least one concave portion opening in the fluid chamber, and at least one wall portion defining a bottom of the at least one concave portion, the at least one wall portion providing the at least one thin portion.

In the fluid-filled vibration damping device according to the third feature (3), the thin portion of the elastic rubber body is elastically deformed, upon reception of a vibrational load, so that the fluid flows between the fluid chamber and the concave portion, e.g., a pocket-like void. Thus, the pocket void functions as a fluid passage, and the area of opening of the pocket void corresponds to the cross-section area of the fluid passage and the depth of the void corresponds to the length of the passage. The cross-section area and length of the pocket void can be adjusted as needed in consideration of the spring characteristic of the thin portion, so that the present vibration damping device may exhibit a more excellent vibration damping effect based on the flows of the fluid in the pocket void, in particular, the resonance of the fluid.

In the case where the pocket void is utilized as a fluid passage and a vibration damping effect based on the flows of the fluid through the fluid passage is obtained, it is preferred that the resonance frequency of the fluid flowing through the fluid passage is tuned to be higher than that of the fluid flowing through the fluid-flow restricting passage defined by the working member. In the last case, the vibration damping device can exhibit, over a wider frequency range, an improved vibration damping effect owing to its low dynamic spring effect based on the fluid passage (or the pocket void) and the restricting passage.

(4) According to a fourth feature of the present invention that includes the third feature (3), a dimension of the concave portion in a circumferential direction of the elastic rubber body increases in an outward direction perpendicular to a central axis of the rubber body that coincides with the central axis of the tubular portion of the second mounting member. In this case, the concave portion can have a sufficiently large area without lowering the spring hardness of the elastic rubber body.

(5) According to a fifth feature of the present invention that includes the third or fourth feature (3) or (4), a ratio of an area of the concave portion that is projected in a direction parallel to a central axis of the elastic rubber body, to an area of the fluid chamber that is projected in the direction, falls within a range of 2 to 15%. In this case, the elastic rubber body is prevented from excessively large decrease of its durability, and the present vibration damping device exhibits an improve d vibration damping effect based on the thin portion of the rubber body. If the projected area is smaller than 2%, the vibration damping device cannot exhibit a sufficiently high vibration damping effect based on the thin portion of the rubber body. If the projected area is greater than 15%, the rubber body might suffer excessively shortened durability. Since the projected area falls within the range of 2 to 15%, the vibration damping device can more advantageously obtain a low dynamic spring effect based on the resonance of the fluid flowing through the concave portion, e.g., the pocket void.

(6) According to a sixth feature of the present invention that includes any one of the first to fifth features (1) to (5), the vibration damping device further comprises a tubular rubber wall which extends from an outer peripheral portion of the elastic rubber body along an inner circumferential surface of the tubular portion of the second mounting member and which is formed integrally with the rubber body such that the rubber wall is fixed to the tubular portion and covers the inner circumferential surface of the tubular portion, the rubber wall including at least one portion which is not aligned with the at least one thin portion in a direction parallel to a central axis of the rubber body and which projects inward to a position inside an inner surface of the thin portion.

In the fluid-filled vibration damping device according to the sixth feature (6), the tubular rubber wall extends from the outer peripheral portion of the elastic rubber body along the inner circumferential surface of the tubular portion of the second mounting member. The tubular rubber wall supports or reinforces the outer peripheral portion of the elastic rubber body, thereby reducing or minimizing the lowering of the spring hardness of the rubber body that results from the formation of the thin portion in the rubber body. In addition, the rubber wall includes at least one thin portion which is aligned with the at least one thin portion of the elastic rubber body. Therefore, the rubber body can have one or more sufficiently large thin portions, and the vibration damping device can exhibit an improved vibration damping characteristic based on the thin portion or portions of the rubber body.

(7) According to a seventh feature of the present invention that includes the sixth feature (6), the vibration damping device further comprises a rigid support member which is fixed to the second mounting member such that the support member is held in contact with an end surface of the tubular rubber wall that is remote from the rubber body, so as to support the rubber wall. The rigid support member effectively helps the tubular rubber wall support and reinforce the elastic rubber body.

(8) According to an eighth feature of the present invention that includes any one of the first to seventh features (1) to (7), the vibration damping device further comprises, in addition to the fluid chamber as a primary fluid chamber, an auxiliary fluid chamber which produces, upon application of a vibrational load to the vibration damping device, a pressure difference with respect to the primary fluid chamber, and a fluid-flow passage which communicates the primary and auxiliary fluid chambers with each other.

The fluid-filled vibration damping device according to the eighth feature (8) can exhibit an excellent vibration damping effect based on the flows of the fluid through the fluid-flow passage between the primary and auxiliary fluid chambers, in particular, the resonance of the fluid. The fluid-flow passage may be tuned to a frequency range different from that to which the fluid-flow restricting passage defined by the working member is tuned. In the latter case, the vibration damping device can exhibit an excellent vibration damping effect in a wider frequency range. In order to obtain both a high vibration damping effect based on the fluid-flow passage and a high vibration damping effect based on the restricting passage defined by the working member, it is preferred that the fluid-flow passage is tuned to a frequency range lower than that to which the restricting passage is tuned.

The fluid-flow passage may be one which always keeps the fluid communication between the primary and auxiliary fluid chambers, one which is provided with an opening and closing means such as a valve and which can be opened and closed by the means, or one which is provided with a partition member which is displaceable or deformable to permit the fluid to flow and which is controllable with respect to mount of displacement or amount of deformation for the purpose of controlling the amount of flow of the fluid. Otherwise, the fluid-flow passage may have any one of various known structures.

It is preferred that the fluid-flow passage is formed to have such a structure which communicates the auxiliary chamber with the other of the two divided chambers of the fluid chamber that is opposite, with respect to the working member, to the one divided chamber located on the side of the elastic rubber body. In this case, the fluid flows in more amount through the fluid-flow restricting passage when the working member is reciprocatively moved in the fluid chamber.

The auxiliary chamber may an equilibrium chamber whose wall is partly provided by a flexible sheet such a thin rubber sheet and whose volume is easily changeable.

(9) According to a ninth feature of the present invention that includes the eighth feature (8), the vibration damping device further comprises a rigid partition member which is fixed to the tubular portion of the second mounting member, so that the primary fluid chamber is provided on one of opposite sides of the partition member and the auxiliary fluid chamber is provided on the other side of the partition member, the partition member defining the fluid-flow passage communicating the primary and auxiliary fluid chambers with each other. In this case, the primary and auxiliary fluid chambers and the fluid-flow passage enjoy respective simple structures.

(10) According to a tenth feature of the present invention, there is provided a fluid-filled vibration damping device comprising a first mounting member; a second mounting member including a tubular portion having an end open toward the first mounting member, the first and second mounting members being spaced from, and opposed to, each other; and an elastic rubber body which elastically connects the first and second mounting members to each other, and which fluid-tightly closes the open end of the tubular portion of the second mounting member, and cooperates with the tubular portion to define a fluid chamber filled with a non-compressible fluid, the elastic rubber body including at least one concave portion opening in the fluid chamber, and at least one wall portion defining a bottom of the at least one concave portion, the at least one wall portion providing at least one thin portion which is thinner than a remaining portion of the rubber body so as to be more easily elastically deformable than the remaining portion.

In the fluid-filled vibration damping device according to the tenth feature (10), the thin portion of the elastic rubber body is elastically deformed, upon reception of a vibrational load, so that the fluid flows in the concave portion, e.g., a pocket-like void. Therefore, the present vibration damping device can exhibit an excellent vibration damping effect based on the flows of the fluid through the pocket void, in particular, the resonance of the fluid. This advantage can be obtained with a simple structure of the damping device, without increasing the total number of parts needed to manufacture the damping device.

(11) According to an eleventh feature of the present invention that includes the tenth feature (10), the elastic rubber body includes a plurality of concave portions opening in the fluid chamber, and a plurality of wall portions defining respective bottoms of the plurality of concave portions, the plurality of wall portions providing a plurality of thin portions each of which is thinner than the remaining portion of the rubber body so as to be more easily elastically deformable than the remaining portion, the thin portions being provided around the central axis of the tubular portion such that the thin portions are substantially equiangularly spaced from each other about the central axis.

(12) According to a twelfth feature of the present invention that includes the tenth or eleventh feature (10) or (11), a dimension of the concave portion in a circumferential direction of the elastic rubber body increases in an outward direction perpendicular to a central axis of the rubber body that coincides with the central axis of the tubular portion of the second mounting member.

(13) According to a thirteenth feature of the present invention that includes any one of the tenth to twelfth feature (10) to (12), a ratio of an area of the concave portion that is projected in a direction parallel to a central axis of the elastic rubber body, to an area of the fluid chamber that is projected in the direction, falls within a range of 2 to 15%.

(14) According to a fourteenth feature of the present invention that includes any one of the tenth to thirteenth features (10) to (13), the vibration damping device further comprises a tubular rubber wall which extends from an outer peripheral portion of the elastic rubber body along an inner circumferential surface of the tubular portion of the second mounting member and which is formed integrally with the rubber body such that the rubber wall is fixed to the tubular portion and covers the inner circumferential surface of the tubular portion, the rubber wall including at least one portion which is not aligned with the at least one thin portion in a direction parallel to a central axis of the rubber body and which projects inward to a position inside an inner surface of the thin portion.

(15) According to a fifteenth feature of the present invention that includes any one of the tenth to fourteenth features (10) to (14), the vibration damping device further comprises, in addition to the fluid chamber as a primary fluid chamber, an auxiliary fluid chamber which produces, upon application of a vibrational load to the vibration damping device, a pressure difference with respect to the primary fluid chamber, and a fluid-flow passage which communicates the primary and auxiliary fluid chambers with each other.

(16) According to a sixteenth feature of the present invention that includes the fifteenth feature (15), the vibration damping device further comprises a rigid partition member which is fixed to the tubular portion of the second mounting member, so that the primary fluid chamber is provided on one of opposite sides of the partition member and the auxiliary fluid chamber is provided on the other side of the partition member, the partition member defining the fluid-flow passage communicating the primary and auxiliary fluid chambers with each other.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 6 is a graph showing respective measured vibration-damping characteristic values of the engine mount of FIG. 1, the engine mount of FIG. 4, and a comparative engine mount.

DETAILED DESCRIPTION OF THE PREFERRED EMBODIMENTS

Figure 1:
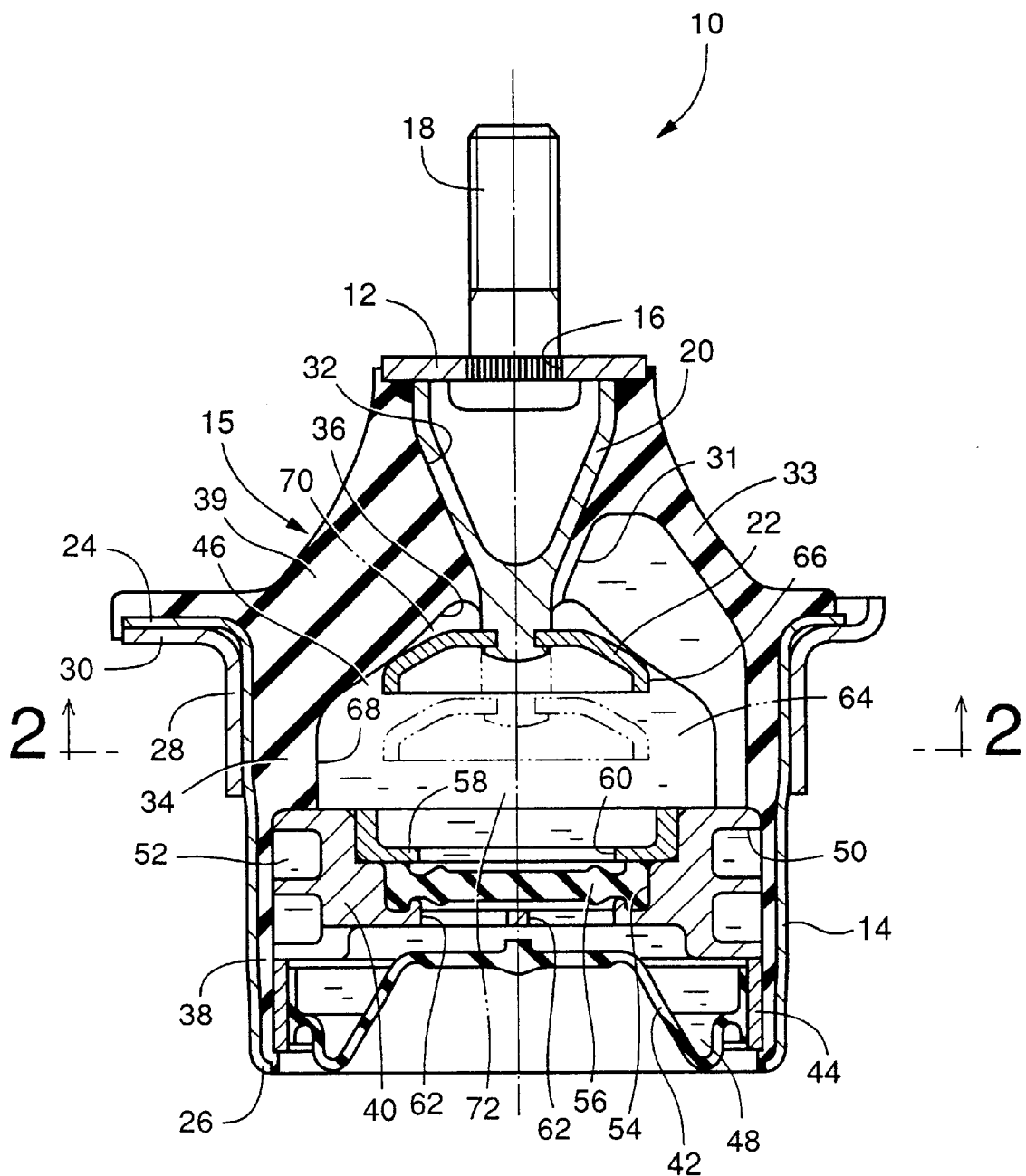
FIG. 1 is a longitudinal cross section view of an engine amount as first embodiment of the present invention, taken along 1—1 in FIG. 2.
Figure 2:
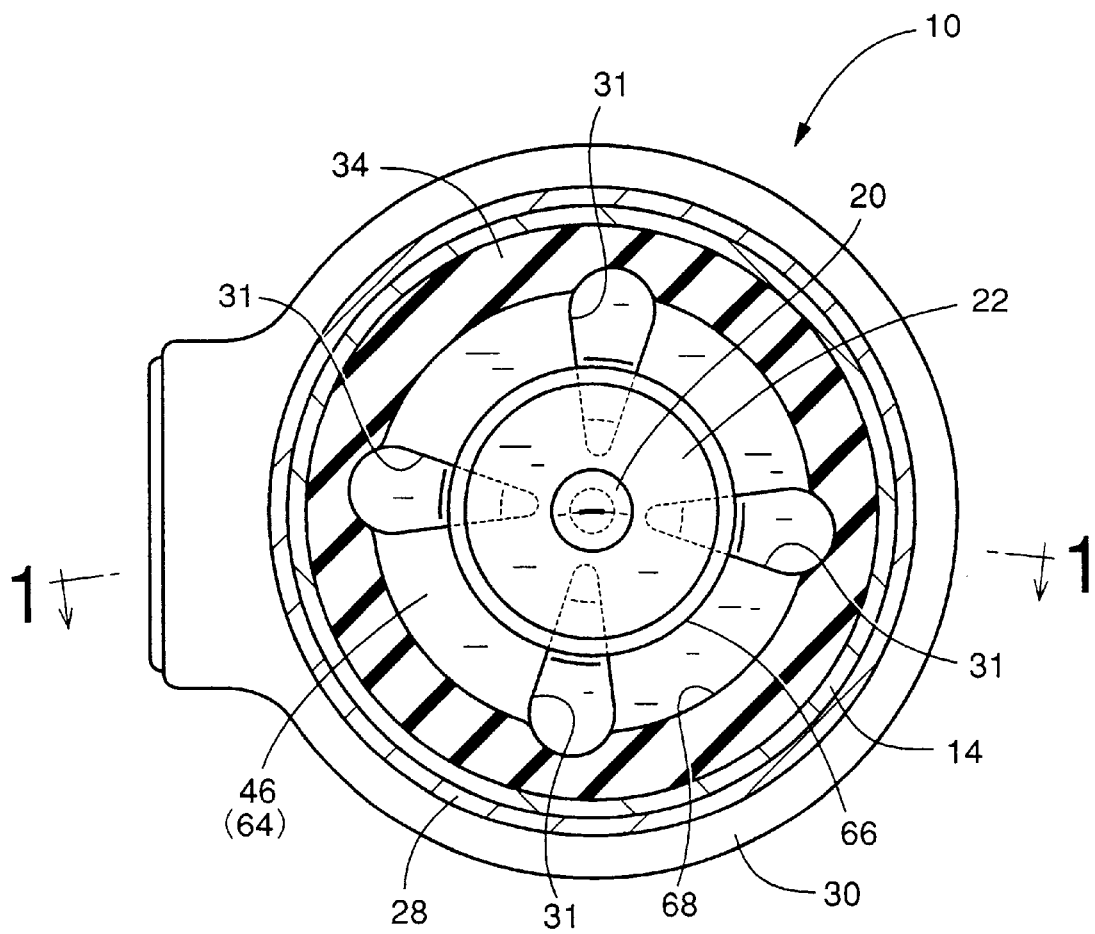
FIG. 2 is a transverse cross section view of the engine amount of FIG. 1, taken along 2—2 in FIG. 1.

FIGS. 1 and 2 show an engine mount 10 for use in an automotive vehicle. The engine mount 10 includes a first mounting member 12 formed of metal, a second mounting member 14 formed of metal, and an elastic rubber body 15 which elastically connects the first and second mounting members 12, 14 to each other. The first mounting member 12 is attached to the power unit (not shown) of the automotive vehicle, and the second mounting member 14 is attached to the body (not shown) of the vehicle, so that the engine mount 10 supports the power unit on the body in a vibration damping fashion. In this state, a main vibrational load is input to the engine mount 10 in a direction in which the first and second mounting members 12, 14 are opposed to each other, that is, in a vertical direction as seen in FIG. 1.

More specifically described, the first mounting member 12 is provided by a rigid member which is formed of metal or the like and has a disc-like shape. A generally inverted-conical support member 20 formed of metal is fixed by welding to the first mounting member 12, so as to project axially downward from the same 12. A working member in the form of umbrella-shaped member 22 formed of metal is fixed by caulking to an axially lower end portion of the support member 20. The umbrella member 22 has a generally disc-like shape, and has a central through-hole which is formed through the thickness of a central portion of the member 22 and in which the lower end portion of the support member 20 is inserted to be fixed by caulking to the umbrella member 22. Thus, the umbrella member 22 extends along a plane perpendicular to a central axis of the support member 20. The first mounting member 12 has a central through-hole 16 which is formed through the thickness of a central portion of the member 12 and in which a fixing bolt 18 is pressfitted to project upward from the member 12, as seen in FIG. 1. With the fixing bolt 18, the first mounting member 12 is attached to the power unit of the vehicle.

The second mounting member 14 is provided by a rigid member which is formed of metal or the like and which has a generally cylindrical shape having a large diameter. The second mounting member 14 is spaced from the first mounting member 12 in a direction parallel to a central axis of the member 12. The second mounting member 12 includes an integral flange portion 24 which extends radially outward from an upper one of axially opposite open ends of the member 12, and includes an integral engaging portion 26 which is somewhat bent radially inward from the lower open end of the member 12. The second mounting member 14 is press-fitted in a rigid bracket 28 having a thick-walled cylindrical shape having a large diameter, and is attached to the body of the vehicle with the bracket 28 being fixed to the body with fixing bolts or the like. The bracket 28 includes an integral flange portion 30 which extends radially outward from one of axially opposite ends of the bracket 28. Since the flange portion 24 of the second mounting member 14 is superposed on the flange portion 30 of the bracket 28, the engine mount 10 enjoys a high withstand-load strength with respect to the direction in which the load of the power unit is applied to the engine mount 10.

Figure 3:
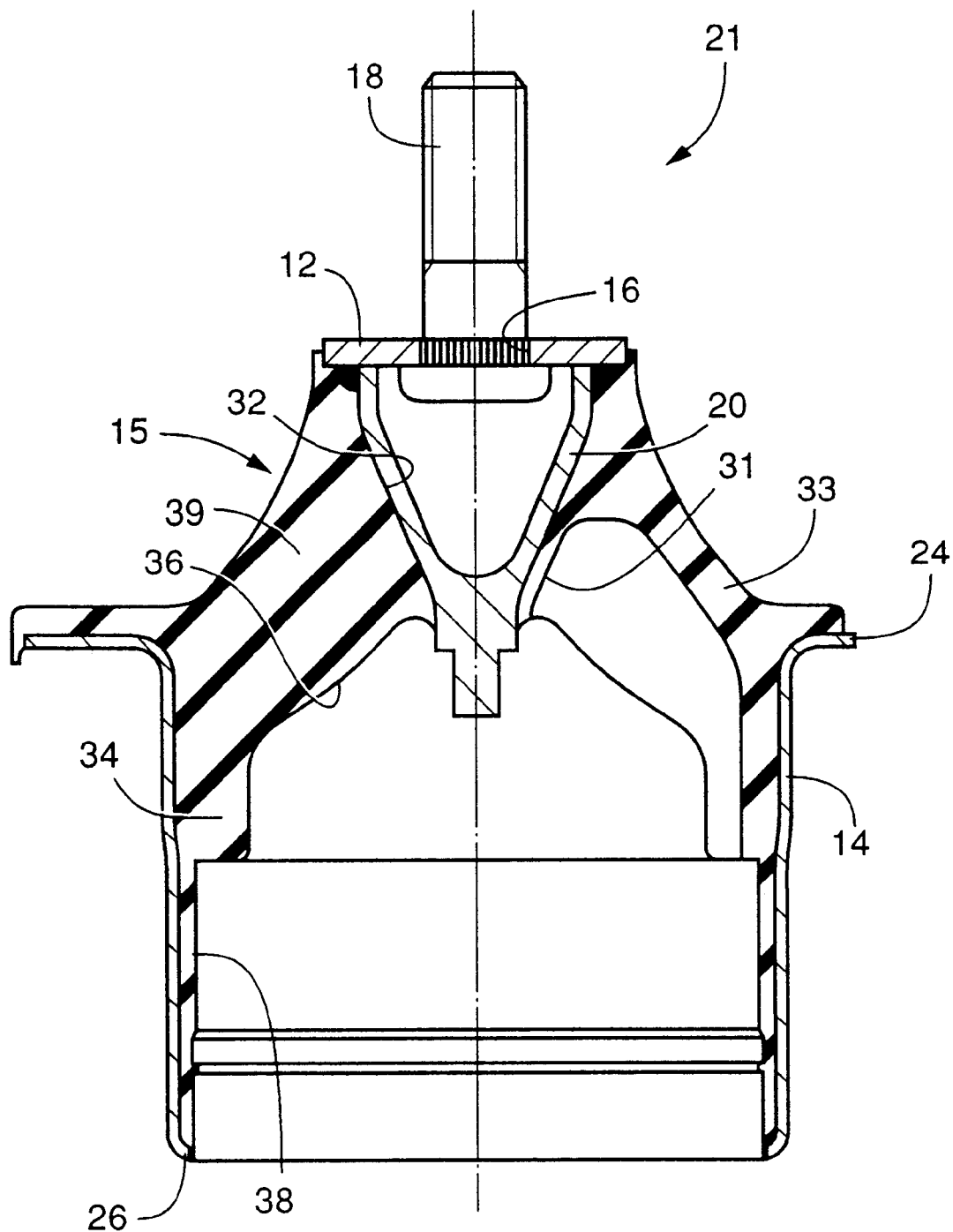
FIG. 3 is a longitudinal cross section view corresponding to FIG. 1, showing an integrally vulcanized product as part of the engine mount of FIG. 1.

The elastic rubber body 15 is interposed between the first and second mounting members 12, 14. The rubber body 15 has a generally thick-walled, tapered, cylindrical shape whose central portion is tapered in its axially upward direction. Thus, the rubber body 15 has a generally frustoconical, outer circumferential surface. The first mounting member 12 is vulcanized to a small-diameter, axially upper end surface of the rubber body 15, and an inner circumferential surface of the upper end portion of the second mounting member 14 is vulcanized to an outer circumferential surface of a large-diameter, axially lower end portion of the rubber body 15. The support member 20 welded to the first mounting member 12 extends through a central bore 32 of the rubber body 15 and is vulcanized to an inner surface of the rubber body 15 that defines the central bore 32. Thus, in the present embodiment, the first and second mounting members 12, 14 and the elastic rubber body 15 are manufactured in the form of an integrally vulcanized product 21 as shown in FIG. 3.

The elastic rubber body 15 is continuous with its integral portion which extends over a substantially entire inner circumferential surface of the second mounting member 14. The integral portion includes a thick-walled tubular rubber wall 34 as a buffer rubber which covers the axially upper half portion of the inner surface of the second mounting member 14. The rubber body 15 and the rubber wall 34 cooperate with each other to define a generally cylindrical void 36 opening downward. The lower end portion of the support member 20 projects into the void 36 from the center of an upper surface (i.e., bottom surface) of the void 36. Thus, the umbrella member 22 supported by the support member 20 is located in the void 36. The above-indicated integral portion additionally includes a thin-walled seal rubber layer 38 which covers the axially lower half portion of the inner surface of the second mounting member 14. Thus, the elastic rubber body 15, the tubular rubber wall 34, and the seal rubber layer 38 are formed integrally with one another.

Four concave portions in the form of four pocketlike voids 31 are formed in an inner portion of the tapered portion of the elastic rubber body 15 that is located between the first and second mounting members 12, 14. Each of the pocket voids 31 has a predetermined depth and opens downward in the cylindrical void 36. The rubber body 15 includes four thin-walled wall portions 33 providing respective bottoms of the four pocket voids 31. Thus, the wall portions 33 are thinner than the remaining, four thick walled portions of the rubber body 15. In the present embodiment, the wall portions 33 have a generally constant thickness equal to about one fourth to about one third of the thickness of the remaining portions of the rubber body 15.

In the present embodiment, the four pocket voids 31 have an identical shape and are provided around the central axis of the elastic rubber body 15 such that the four voids 31 are equiangularly spaced from one another about the central axis. Thus, the rubber body 15 has two pairs of pocket voids 31 one pair of which are opposed to each other in one of two directions each of which is perpendicular to the central axis of the rubber body 15 and which are perpendicular to each other and the other of which are opposed to each other in the other direction. Each of the pocket voids 31 has, in a radial direction of the rubber body 15, a dimension generally equal to the radius of the body 15 and has, in a circumferential direction of the body 15, a dimension which increases in a radially outward direction of the body 15. Thus, each pocket void 31 has a generally part-sectorial cross section. The area of the lower opening of each pocket void 31 that is projected in a direction (hereinafter, referred to as the "axial direction") parallel to the central axis of the rubber body 15, is equal to 2 to 15%, more preferably, 5 to 10%, of the area of the cylindrical void 36 that is projected in the axial direction.

In the present embodiment, the radially outer edge of the lower opening of each of the pocket voids 31 is located radially outward of an inner circumferential surface of the tubular rubber wall 34. That is, the pocket voids 31 extend downward and reach the rubber wall 34, so that the rubber wall 34 has a shape as if an inner portion of the rubber wall 34 were cut away by the pocket voids 31. That is, the thickness of the rubber wall 34 is smaller at respective portions thereof corresponding to the pocket voids 31, than at the remaining portions thereof. Those thick-walled portions of the rubber wall 34 reinforce the axially lower end portion (i.e., outer peripheral portion) of the rubber body 15.

As described above, in the present embodiment, the elastic rubber body 15 has the four pocket voids 31 which are equiangularly spaced from one another about the central axis of the body 15. Therefore, the rubber body 15 has four thick-walled portions 39 which are free of the voids 31, are equiangularly spaced from one another about the central axis of the body 15, and have respective angular phases different from those of the corresponding voids 31 by 45 degrees. Thus, the four thick-walled portions 39 cooperate with one another to give, to the rubber body 15, a generally uniform spring hardness or stiffness in respective radial directions perpendicular to the central axis of the body 15. In a particular case where the engine mount 10 is installed on the automotive vehicle such that the four thick-walled portions 39 are oriented in forward and backward directions and leftward and rightward directions of the vehicle, in which considerably great vibrational loads are applied to the engine mount 10, the engine mount 10 advantageously enjoys a high spring hardness in its radial directions perpendicular to its central axis.

A partition member 40 and a diaphragm 42 are inserted in the order of description through the axially lower open end of the second mounting member 14, and are assembled with the integrally vulcanized product 21. The partition member 40 is provided by a rigid member which is formed of synthetic resin, metal such as aluminum alloy, or the like and which has a generally disc-like shape. The diaphragm 42 is provided by a thin rubber sheet which is easily elastically deformable. A cylindrical fitting ring 44 is vulcanized to an outer circumferential surface of the diaphragm 42. After the partition member 40 and the diaphragm 42 are inserted in the second mounting member 14 and are located in the axially lower half portion of the second mounting member 14 that is covered with the seal rubber layer 38, the second mounting member 14 is subjected to a diameter-reducing operation such as eight-die-using drawing. Thus, the partition member 40 and the diaphragm 42 (or the ring 44) are assembled with the vulcanized product 21.

Accordingly, the axially lower open end of the second mounting member 14 is fluid-tightly closed by the diaphragm 42, so as to define, in the second mounting member 14, a fluid-filled space which is air-tightly isolated from the ambient air and is filled with a non-compressible fluid. The non-compressible fluid may be selected from among water, alkylene glycol, polyalkylene glycol, silicone oil, or a mixture of two or more of them. However, in order to obtain an excellent vibration-damping effect based on resonance of the fluid, it is preferred that the fluid has a low viscosity of not more than 0.1 Pa·s. Filling the space with the non-compressible fluid can be advantageously carried out by, for example, assembling the partition member 40 and the diaphragm 42 with the vulcanized product 21, in a tank filled with the fluid.

The fluid-filled space is divided into upper and lower fluid-filled spaces by the partition member 40. The upper fluid-filled space that is partly defined by the elastic rubber body 15 provides a pressure receiving chamber 46 as a primary fluid chamber whose pressure changes upon application of a vibrational load to the engine mount 10. The lower fluid-filled space that is partly defined by the diaphragm 42 provides an equilibrium chamber 48 as an auxiliary fluid chamber whose volume easily changes because of elastic deformation of the diaphragm and thereby absorbs the change of pressure of the pressure receiving chamber 46. The partition member 40 is provided in the second mounting member 14 such that the partition member 40 is held in contact with a radially inner annular portion of the axially lower end surface of the tubular rubber wall 34. Thus, the partition member 40 supports the rubber wall 34, thereby helping the rubber wall 34 reinforce the rubber body 15. The lower open end of the cylindrical void 36 is fluid-tightly closed by the partition member 40, so as to define the pressure receiving chamber 46.

The partition member 40 has a generally spiral groove 50 which is continuously formed in an outer circumferential surface of the member 40 and opens in the outer surface. The spiral groove 50 is closed by the second mounting member 14 via the seal rubber layer 38, so as to define an orifice passage 52 which communicates the pressure receiving chamber 46 and the equilibrium chamber 48 with each other. Upon application of a vibrational load to the engine mount 10, a pressure difference is produced between the two chambers 46, 48, so that the fluid flows through the orifice passage 52 and thereby exhibits a certain vibration damping effect. In the present embodiment, the cross-section area, length, etc. of the orifice passage 52 are so determined as to exhibit, based on the resonance of the fluid flowing through the passage 52, an excellent vibration damping effect against a low-frequency vibration such as engine shake.

The partition member 40 has a generally cylindrical central hole 54 which opens in an upper surface thereof, and a flexible rubber plate 56 is accommodated in the central hole 54. The rubber plate 56 is assembled with the partition member 40 in such a manner that an outer peripheral portion of the plate 56 is fluid-tightly sandwiched by a bottom surface of the central hole 54 and an annular hold-down ring 58 fixedly fitted in an axially upper open end of the central hole 54. In this state, a central portion of the upper surface of the rubber plate 56 is exposed to the fluid present in the pressure receiving chamber 46 via a central aperture 60 of the ring 58. Meanwhile, a central portion of the lower surface of the rubber plate 56 is exposed to the fluid present in the equilibrium chamber 48 via a plurality of communication holes 62 formed through the thickness of a bottom wall of the partition member 40 that defines the bottom surface of the central hole 54. Thus, the upper and lower surfaces of the rubber plate 56 receive the respective fluid pressures in the two chambers 46, 48, respectively. Therefore, upon application of a vibrational load to the engine mount 10, the rubber plate 56 is elastically deformed because of a pressure difference produced between the two chambers 46, 48. The elastic deformation of the rubber plate 56 causes flows of the fluid through the central aperture 60 of the ring 58 and the communication holes 62 of the partition member 40, so that the engine mount 10 exhibits, based on the resonance of the fluid and the pressure absorbing effect of the pressure receiving chamber 46, a low dynamic spring effect against input vibrations having frequencies in a predetermined range. In the present embodiment, the spring characteristic of the rubber plate 56 and the cross-section area, fluid-flow length, etc. of the fluid passages are so predetermined that the engine mount 10 exhibits, based on flows of the fluid caused by the elastic deformation of the rubber plate 56, an excellent vibration damping effect against a medium- or high-frequency vibration such as idling vibration or low-speed booming noise. In addition, the amount of elastic deformation of the rubber plate 56 is limited by its elasticity and its contact with the bottom surface of the central hole 54. Therefore, when a lowfrequency, large-amplitude vibration such as engine shake is input to the engine mount 10, the amount of flow of the fluid caused by the elastic deformation of the rubber plate 56 remains small, whereas the flow of the fluid through the orifice passage 52 is permitted in sufficient amount.

In the pressure receiving chamber 46 whose wall is partly provided by the elastic rubber body 15, the umbrella shaped member 22 extends along a plane perpendicular to the vibration-input direction in which a main vibrational load is input to the engine mount 10, that is, the direction parallel to the central axis of the engine mount 10 (i.e., the vertical direction as seen in FIG. 1). In the state in which the power unit is mounted on the engine mount 10, the rubber body 15 is deformed or compressed by the weight of the power unit, so that the umbrella member 22 is moved downward from a state indicated in solid lines in FIG. 1, to a state indicated in phantom lines in which the umbrella member 22 is located in the center of the pressure receiving chamber 46. Thus, the umbrella member 22 divides the chamber 46 into upper and lower divided chambers 70, 72 located on opposite sides of the umbrella member 22 in the vibration input direction, i.e., the axial direction of the engine mount 10. The upper and lower divided chambers 70, 72 are communicated with each other via an annular gap 64 which is defined by, and between, an outer circumferential surface 66 of the umbrella member 22 and an inner circumferential surface 68 of the tubular rubber wall 34 that partly defines the pressure receiving chamber 46. The outer surface 66 and the inner surface 68 are opposed to each other in all radial directions of the engine mount 10, and the annular gap 64 extends continuously all around in a circumferential direction of the umbrella member 22.

In the present embodiment, the umbrella member 22 has a generally skirt-like or tapered shape which is tapered toward its central portion at which the umbrella member 22 is fixed by caulking t o the support member 20. The tapered shape of the umbrella member 22 generally corresponds to the inner circumferential surface of the elastic rubber body 15 that partly defines the pressure receiving chamber 46. The umbrella member 22 includes a cylindrical, axially lower end portion which extends downward from the outer periphery of the tapered portion thereof and whose outer circumferential surface 66 is cylindrical and is concentric with a central axis of the support member 22 (i.e., a central axis of the pressure receiving member 46). The inner circumferential surface 68 of the tubular rubber wall 34 that partly defines the chamber 46 in which the umbrella member 22 is provided, is generally cylindrical and is concentric with the central axis of the chamber 46. Therefore, the annular gap 64 between the respective opposed portions of the outer surface 66 and the inner surface 68 extends continuously all around in the circumferential direction of the umbrella member 22, with a substantially constant dimension in all the radial directions of the same 22.

Thus, the present engine mount 10 has the upper and lower divided chambers 70, 72 which are divided by the umbrella member 22 and are communicated with each other via the annular gap 64. Upon application of a vibrational load to the engine mount 10 in the direction in which the first and second mounting members 12, 14 are opposed to each other, the umbrella member 22 is reciprocatively moved in the pressure receiving chamber 46, so that the fluid flows between the upper and lower chambers 70, 72 via the annular gap 64. Thus, in the present embodiment, the annular gap 64 provides a fluid-flow restricting passage, and the engine mount 10 exhibits a vibration damping effect based on flows of the fluid through the restricting passage. The frequency range in which the mount 10 exhibits a low dynamic spring effect based on the resonance of the fluid flowing through the gap 64 can be tuned by adjusting the ratio of the cross-section area of the gap 64 to the length of the same 64 while taking, into account, the spring hardness of the rubber wall defining the chamber 46 and the density of the fluid enclosed in the chamber 46. As far as the present embodiment is concerned, it is preferred that the above indicated frequency range is higher (e.g., including high speed booming noise) than that against which the mount 10 exhibits a vibration damping effect based on flows of the fluid caused by the elastic deformation of the rubber plate 56. In this case, the engine mount 10 can exhibit an excellent vibration damping effect in a wide frequency range based on not only the orifice passage 52 and the rubber plate 56 but also the annular gap or restricting passage 64.

When the umbrella member 22 is reciprocatively moved upon application of the vibrational load, the wall portions 33 that define the pocket voids 31 and thereby partly define the upper divided chamber 70 can be elastically deformed considerably easily by the change of pressure of the fluid present in the chamber 70. Thus, the umbrella member 22 can be easily moved in the pressure receiving chamber 46, so that the relative change between the respective volumes of the upper and lower divided chambers 70, 72 easily occurs. Consequently a sufficient amount of fluid flows through the annular gap 64. Thus, the engine mount 10 advantageously exhibits a low dynamic spring effect, and accordingly an excellent vibration damping effect, based on the resonance of the fluid flowing through the annular gap 64.

In the present embodiment, the pressure receiving chamber 46 is communicated with the equilibrium chamber 48 via the orifice passage 52 and the rubber plate 56, and the annular gap 64 is tuned to the frequency range higher than that to which the passage 52 and the plate 56 are tuned. Upon application of the high-frequency vibration to which the annular gap 64 is tuned, the elastic deformation of the wall portions 33 defining the pocket voids 31 effectively causes the fluid to flow between the upper and lower divided chambers 70, 72, thereby reducing or preventing the flowing of the fluid away from the pressure receiving chamber 46 into the equilibrium chamber 48 via the orifice passage 52 and the rubber plate 56. Thus, the present engine amount 10 exhibits an excellent vibration damping effect against not only the low- or medium-frequency input vibration based on the respective operations of the orifice passage 52 and the rubber plate 56, but also the high-frequency vibration based on the resonance of the fluid flowing in sufficient amount through the annular gap 64.

In the present embodiment, the elastic deformation of the wall portions 33 of the elastic rubber body 15 causes the fluid to flow between the pressure receiving chamber 46 (or the upper divided chamber 70) and the pocket voids 31. The cross-sectional area and fluidflow length of each of the pocket voids 31 through which the fluid flows are so determined while taking into account the expansion spring hardness of the wall portions 33 and the density of the fluid enclosed, so that the engine mount 10 can exhibit a low dynamic spring effect against a target vibration-frequency range based on the resonance of the fluid flowing through the voids 31.

For example, in the case where the engine mount 10 is so tuned as to exhibit, in a substantially same vibration-frequency range, both the low dynamic spring effect based on the resonance of the fluid flowing through the pocket voids 31 and the low dynamic spring effect based on the resonance of the fluid flowing through the annular gap 64, the fluid flows in more amount through the annular gap 64, in that frequency range, so that the mount 10 exhibits a more excellent vibration damping effect in that frequency range.

Alternatively, in the case where the engine mount 10 is so tuned as to exhibit the above-indicated two sorts o f low dynamic spring effects, in respective frequency ranges which differ from each other by several tens of hertz (iz) to several hundred hertz (Hz), the mount 10 exhibits a low dynamic spring effect based on the resonance of the overall fluid in a wide frequency range including the above-indicated two ranges, and accordingly exhibits an excellent vibration damping effect in that wide frequency range. In the last case, it is preferred that the frequency range to which the fluid flowing through the pocket voids 31 is tuned is higher than that to which the fluid flowing through the annular gap 64 is tuned.

Figure 4:
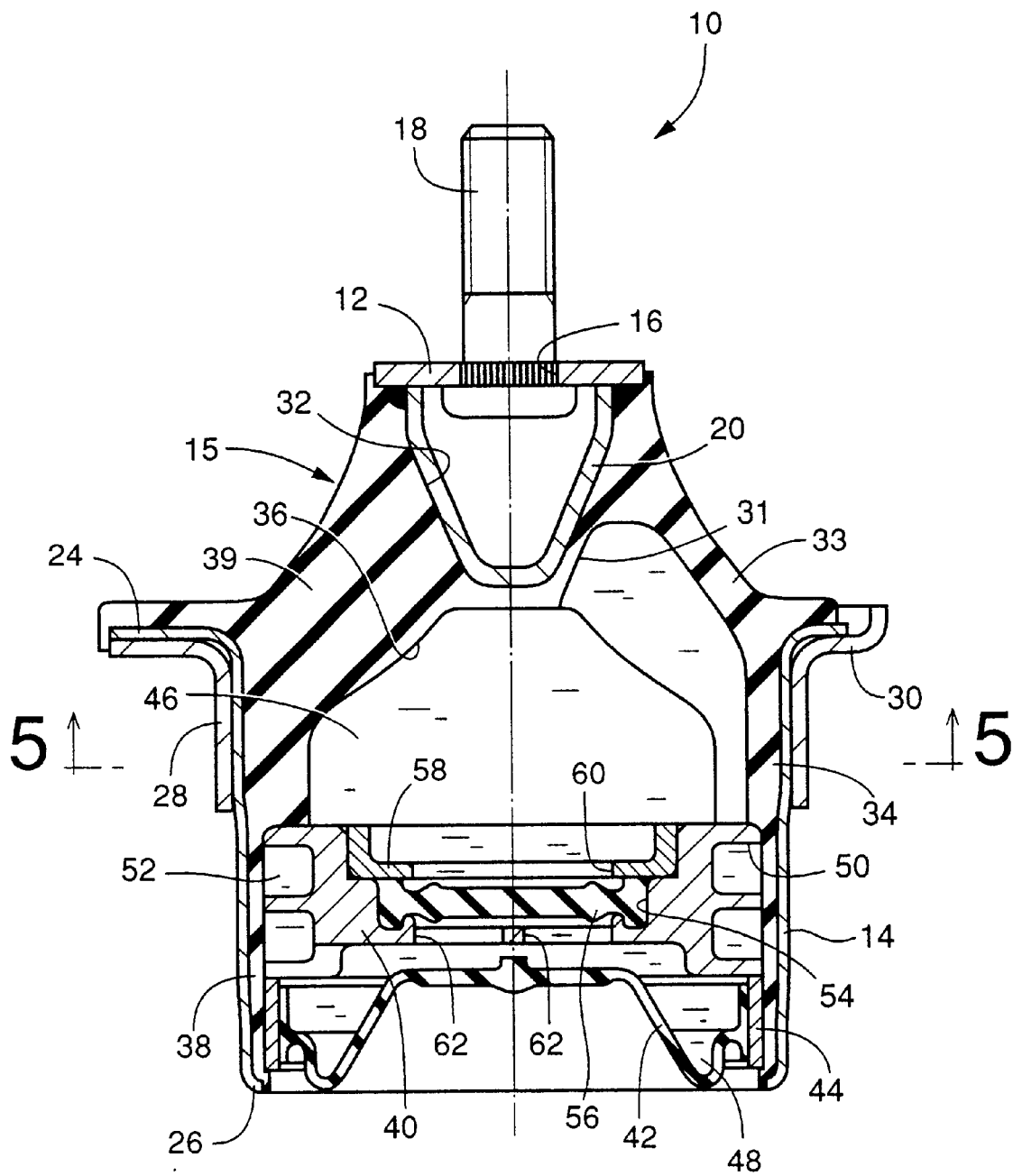
FIG. 4 is a longitudinal cross section view of another engine amount as a second embodiment of the present invention, taken along 4—4 in FIG. 5.
Figure 5:
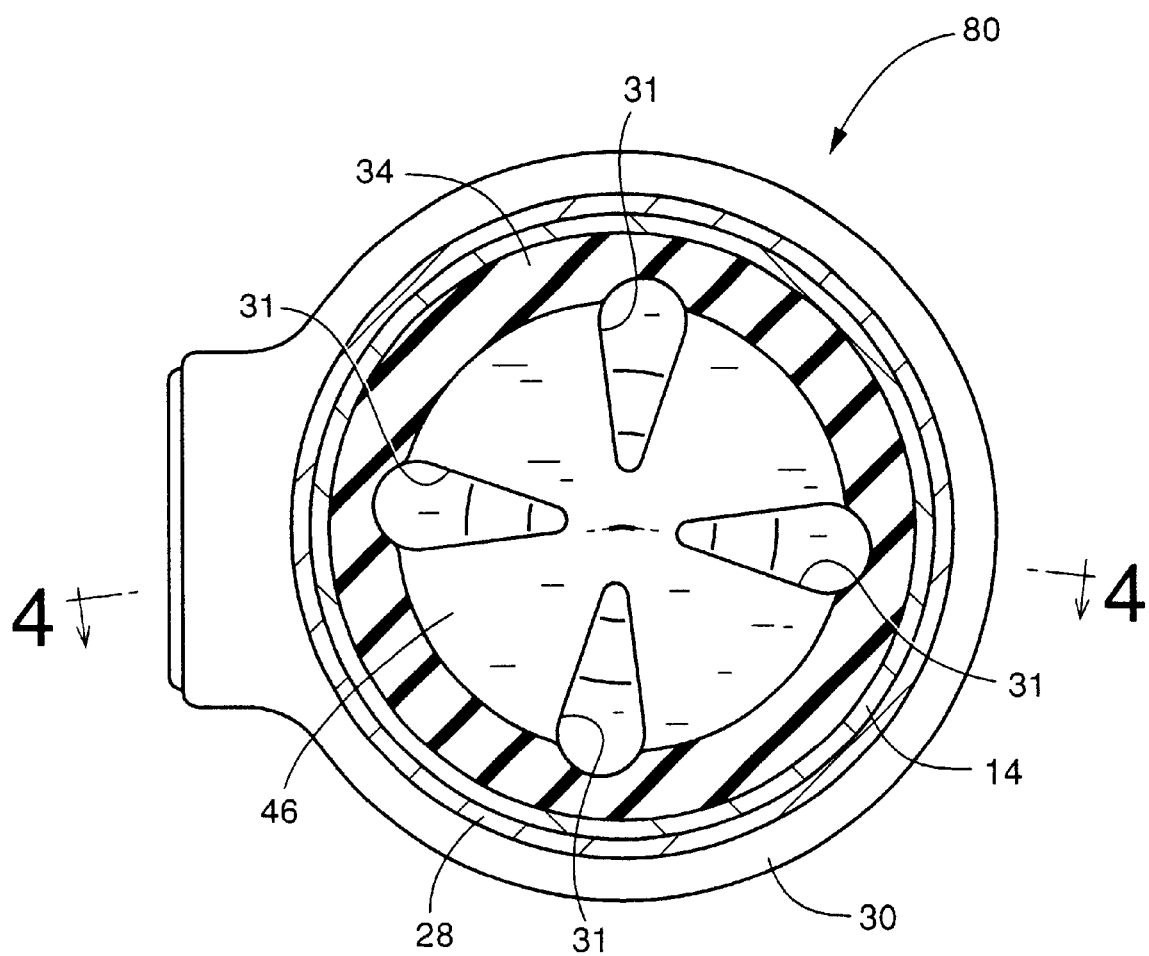
FIG. 5 is a transverse cross section view of the engine amount of FIG. 4, taken along 5—5 in FIG. 4.

FIGS. 4 and 5 show an automotive-vehicle engine mount 80 as a second embodiment of the present invention. The second engine mount 80 is basically identical with the first engine mount 10 shown in FIGS. 1 to 3, but is different from the first mount 10 in that the second mount 80 does not have the umbrella-shaped member 22 in the pressure receiving chamber 46, the chamber 46 is not divided by the umbrella member 22 into the two divided chambers 70, 72, and the annular gap or fluid-flow restricting passage 64 is not defined by the umbrella member 22 in the chamber 46. The same reference numerals as used for the first engine mount 10 as the first embodiment, shown in FIGS. 1 to 3, are used to designate the corresponding elements and parts of the second engine mount 80 as the second embodiment, shown in FIGS. 4 and 5, and the description thereof is omitted.

The second engine mount 80 having the above-indicated structure exhibits, like the first engine mount 10, a vibration damping effect against the low-or medium-frequency input vibration based on the respective operations of the orifice passage 52 and the rubber plate 56. In addition, upon inputting of the high-frequency vibration to the engine mount 80, the wall portions 33 defining the pocket voids 31 are elastically deformed so that the fluid pressure of the pressure receiving chamber 46 is prevented from being excessively increased. Thus, the spring constant of the engine mount 10 is prevented from being excessively increased, and the excellent vibration damping effect of the mount 10 is maintained.

In the second engine mount 80, too, the pocket voids 31 function as fluid passages. Therefore, the cross-sectional area and fluid-flow length of each of the voids 31 are adjusted or tuned so that the engine mount 80 exhibits, in a target vibration-frequency range, the low dynamic spring effect based on the resonance of the fluid flowing through the voids 31. In this case, the engine mount 80 can exhibit a more excellent vibration damping effect against input vibrations in a specific high-frequency range.

FIG. 6 shows respective measured vibration damping characteristic values (i.e., absolute spring constant values) of the first and second engine mounts 10, 80 and a comparative example which is obtained without forming any pocket voids 31 in the elastic rubber body 15 of the first engine mount 10 but has the umbrella-shaped member 22 in the pressure receiving chamber 46.

As is apparent from the results shown in FIG. 6, the second engine mount 80 without the umbrella member 22 exhibits substantially the same degree of low dynamic spring effect as that of the comparative example with the umbrella member 22, and the second engine mount 80 can be tuned to exhibit the low dynamic spring effect in a frequency range higher than that in which the low low dynamic spring effect based on the umbrella member 22 is exhibited. In addition, the first engine mount 10 exhibits a low dynamic spring effect in a wider frequency range than that in which the comparative mount with the umbrella member 22 only or the second mount 80 with the pocket voids 31 only does.

While the present invention has been described in its preferred embodiments, the present invention may be otherwise embodied.

For example, the cylindrical outer circumferential surface 66 of the umbrella member 22 or the cylindrical inner circumferential surface 68 of the tubular rubber wall 34 may be modified to have an elliptic or polygonal shape or other appropriate shape. In addition, the respective cylindrical surfaces 66, 68 of the umbrella member 22 and the rubber wall 34 that are similar to each other may be modified to have non-similar surfaces, so that the annular gap or fluid-flow restricting passage 64 defined between the two surfaces may be modified to have different radial dimensions in different radial directions of the umbrella member 22.

The distance between the outer surface 66 of the umbrella member 22 and the inner surface 68 of the rubber wall 34 may be so determined that the two surfaces 66, 68 can be brought into abutting contact with each other to limit the amount of relative movement between the first and second mounting members 12, 14 in the direction perpendicular to the axial direction of the engine mount 10, 80. In this case, the umbrella member 22 functions as a stopper.

In each of the first and second engine mounts 10, 80, the orifice passage 52 is employed to damp the lowfrequency vibration and the rubber plate 56 is employed to damp the medium-frequency vibration. However, the orifice passage 52 and/or the rubber plate 56 may, or may not, be employed depending upon the vibration damping characteristics the mount 10, 80 is required to have. Thus, each of the orifice passage 52 and the rubber plate 56 is not essential to the concept of the present invention.

The concept of the present invention is applicable to not only automotive-vehicle engine mounts but also automotive-vehicle body mounts, differential mounts, and suspension bushings, and additionally to various vibration damping devices which are employed in other structures than automotive vehicles.

It is to be understood that the present invention may be embodied with other changes, modifications, and improvements that may occur to one skilled in the art without departing from the scope and spirit of the invention defined in the appended claims.

What is claimed is:

1. A fluid-filled vibration damping device comprising:

a first mounting member;

a second mounting member including a tubular portion having an end open toward the first mounting member, the first and second mounting members being spaced from, and opposed to, each other;

an elastic rubber body which elastically connects the first and second mounting members to each other, and which fluid-tightly closes the open end of the tubular portion of the second mounting member and cooperates with said tubular portion to define a fluid chamber filled with a non-compressible fluid; and a working member which is supported by the first mounting member such that the working member extends, in the fluid chamber, in a direction substantially perpendicular to a central axis of the tubular portion of the second mounting member, and thereby divides the fluid chamber into two divided chambers which are located on opposite sides of the working member, respectively, and which are communicated with each other via a fluid-flow restricting passage defined by at least the working member, the elastic rubber body including at least one thin portion which is located on a side of one of the two divided chambers and which is thinner than a remaining portion of the rubber body so as to be more easily elastically deformable than the remaining portion, wherein the elastic rubber body includes at least one concave portion opening in the fluid chamber, and at least one wall portion defining a bottom of the at least one concave portion, the at least one wall portion providing the at least one thin portion, and wherein a ratio of an area of the concave portion that is projected in a direction parallel to a central axis of the elastic rubber body, to an area of the fluid chamber that is projected in s aid direction, falls within a rang e of 2 to 15%.

2. A fluid-filled vibration damping device according to claim 1, wherein the elastic rubber body includes a plurality of thin portions which are located on the side of said one divided chamber and each of which is thinner than the remaining portion of the rubber body so as to be more easily elastically deformable than the remaining portion, the thin portions being provided around the central axis of said tubular portion such that the thin portions are substantially equiangularly spaced from each other about the central axis.

3. A fluid-filled vibration damping device according to claim 2, wherein the elastic rubber body includes a plurality of concave portions opening in the fluid chamber, and a plurality of wall portions each of which define a bottom of a corresponding one of the concave portions, the wall portions providing the thin portions, respectively.

4. A fluid-filled vibration damping device according to claim 3, wherein a ratio of an area of each of the concave portions that is projected in said direction parallel to said central axis of the elastic rubber body, to said area of the fluid chamber that is projected in said direction, falls within a range of 2 to 15%.

5. A fluid-filled vibration damping device according to claim 1, wherein a dimension of the concave portion in a circumferential direction of the elastic rubber body increases in an outward direction perpendicular to a central axis of the rubber body that coincides with the central axis of the tubular portion of the second mounting member.

6. A fluid-filled vibration damping device according to claim 1, further comprising at tubular rubber wall which extends from an outer peripheral portion of the elastic rubber body along an inner circumferential surface of the tubular portion of the second mounting member and which is formed integrally with the rubber body such that the rubber wall is fixed to said tubular portion and covers the inner circumferential surface of said tubular portion, the rubber wall including at least one portion which is not aligned with the at least one thin portion in a direction parallel to a central axis of the rubber body and which projects inward to a position inside an inner surface of the thin portion.

7. A fluid-filled vibration damping device according to claim 6, further comprising a rigid support member which is fixed to the second mounting member such that the support member is held in contact with an end surface of the tubular rubber wall that is remote from the rubber body, so as to support the rubber wall.

8. A fluid-filled vibration damping device according to claim 1, further comprising, in addition to the fluid chamber as a primary fluid chamber, an auxiliary fluid chamber which produces, upon application of a vibrational load to the vibration damping device, a pressure difference with respect to the primary fluid chamber, and a fluidflow passage which communicates the primary and auxiliary fluid chambers with each other.

9. A fluid-filled vibration damping device according to claim 8, further comprising a rigid partition member which is fixed to the tubular portion of the second mounting member, so that the primary fluid chamber is provided on one of opposite sides of the partition member and the auxiliary fluid chamber is provided on the other side of the partition member, the partition member defining the fluid-flow passage communicating the primary and auxiliary fluid chambers with each other.

10. A fluid filled vibration damping device according to claim 5, wherein a ratio of an area of the concave portion that is projected in said direction parallel to said central axis of the elastic rubber body, to said area of the fluid chamber that is projected in said direction, falls within a range of 5 to 10%.

11. A fluid-filled vibration damping device according to claim 1, wherein the damping device damps vibration, based on resonance of the fluid flowing through the concave portion, at a substantially same frequency range as a frequency range in which the damping device damps vibration based on resonance of the fluid flowing through the restricting passage.

12. A fluid-filled vibration damping device according to claim 1, wherein the damping device damps vibration, based on resonance of the fluid flowing through the concave portion, at a frequency range higher than a frequency range in which the damping device damps vibration based on resonance of the fluid flowing through the restricting passage.

* * * * *